United States Patent

[11] 3,616,185

[72] Inventor Samuel Goldberg
4056 Nichols Ave. S.W., Washington, D.C. 20032
[21] Appl. No. 47,070
[22] Filed June 17, 1970
[45] Patented Oct. 26, 1971
Continuation-in-part of application Ser. No. 594,590, Nov. 15, 1966, now abandoned.

[54] GLASS FIBER ARTICLES WITH A PROTECTIVE LAYER OF POLYURETHANE AND METHOD OF PREPARATION
2 Claims, 1 Drawing Fig.

[52] U.S. Cl. .................................................. 161/185,
156/330, 156/331, 161/93, 161/190, 260/858,
264/257, 117/72
[51] Int. Cl. ........................................................ B32b 17/10,
B32b 27/38, B32b 27/40

[50] Field of Search ........................................... 161/185,
190, 124, 166, 93, 192, 194, DIG. 4; 156/330, 331;
260/858; 264/219, 241, 257

[56] References Cited
UNITED STATES PATENTS

| | | | |
|---|---|---|---|
| 2,642,370 | 6/1953 | Parsons ...................... | 161/93 |
| 3,030,249 | 4/1962 | Schollenberger ............ | 161/190 |
| 3,042,545 | 7/1962 | Kienle .......................... | 156/330 X |
| 3,227,603 | 1/1966 | Kraiman ...................... | 161/190 X |
| 3,391,053 | 7/1968 | Kolb ............................. | 161/185 |
| 3,426,097 | 2/1969 | Ilkka ............................ | 260/858 X |
| 3,494,888 | 2/1970 | McElroy ...................... | 161/185 X |

*Primary Examiner*—John T. Goolkasian
*Assistant Examiner*—M. E. McCamish
*Attorneys*—R. S. Sciascia and Thomas O. Watson, Jr.

ABSTRACT: A coating to protect exposed glass fabric articles comprising polyurethane. The polyurethane is bonded to the glass fabric by applying a graduated premixture of polyurethane and epoxy resin between the polyurethane and glass fabric.

PATENTED OCT 26 1971 3,616,185
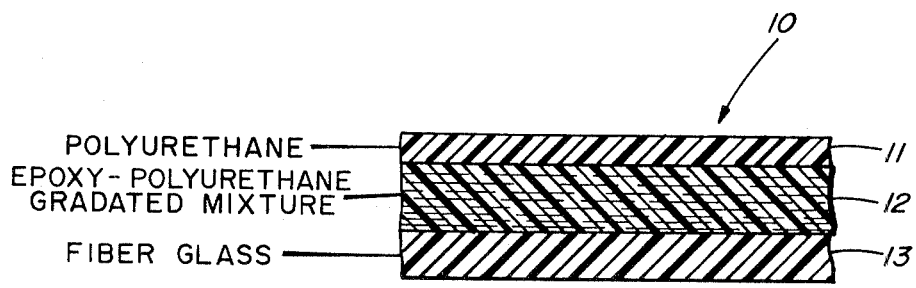
INVENTOR.
SAMUEL GOLDBERG
BY Thomas O. Watson Jr.
ATTORNEY

GLASS FIBER ARTICLES WITH A PROTECTIVE LAYER OF POLYURETHANE AND METHOD OF PREPARATION

This application is a continuation-in-part of application Ser. No. 594,590 filed Nov. 15, 1966 for Method and Means for Protecting Glass Reinforced Plastic Construction From the Elements, now abandoned.

The invention described herein may be manufactured and used by or for the Government of the United States of America for governmental purposes without the payment of any royalties thereon or therefor.

The present invention relates to a novel means and technique for protecting exposed glass reinforced plastic surfaces against the damaging effect of environmental influences such as erosion and ablation.

Plastic reinforced fiber glass sheets or laminates are currently employed in use for radomes, fairings, leading edge constructions for hydrofoils, helicopter blades, aircraft wings, sonar domes, etc., because they possess certain characteristics which are highly desirable in terms of strength, high frequency radiation transparency, moldability and nonstrategic availability. However, this construction is very susceptible to deterioration caused by aerodynamic and hydrodynamic heating and in addition, to erosion or ablation caused by contact with foreign particles in air or water media. As exposed parts of high-speed aircraft, these glass fabric constructions have been found to become severely impaired because of impinging rain drops, hail or sand and, at supersonic speeds, because of minute dust particles. Also, they are markedly susceptible to problems of erosion and delamination when used as components of watercraft and aircraft, not only because of the difficulty of producing a composite of void-free laminates, but also because of inadequate protection of the structure at its outer surface which results in a loosening and raising of the reinforcing fibers near the surface. Once the outer laminate deteriorates, the eroding particles tend to seek out and enlarge to the critical point, those otherwise undiscernible voids in the laminate; or, once the reinforcing fibers are raised multiple paths are provided for the ingress of water into the body of the structure, thus accelerating hydrolytic degradation.

Various techniques are currently in use for the protection of these plastic reinforced glass fabric articles, among these being the application of a synthetic rubber such as neoprene, or similar paint type coatings, to the exposed surfaces. Although the lifespan of the substrate is somewhat increased, disadvantages including uncertain adhesive qualities, questionable durability, peeling and difficulty in reapplication, negate its use for any prolonged application.

Polyurethane rubber has been found to adequately resist erosion and ablation when applied to radomes, sonar domes and various leading edges in air and water media. The polyurethanes most suitable for this purpose are those well known in the art as polyesterurethanes and polyetherurethanes which have elastomerlike characteristics.

Polyurethane rubber developes excellent adhesion to fiber glass when premixed or reacted with an epoxy resin chosen from the class of cross-linked polyethers that is well known in the art before being applied to the fiber or glass reinforced plastic backup structure. On the outer surface of this mixture of 100 percent or pure polyurethane is applied which renders the product thereby produced one in which its outer exposed surface is wholly elastomeric and its inner surface rigid, upon curing, with a varying concentration thereinbetween of a polyurethane-epoxy mixture. The unit is cured in a single process under suitable temperature and pressure conditions. In this way, sharp and distinct interfaces between the elastomeric coating, the epoxy resin, and the fiberglass is substantially eliminated because no discrete layer of epoxy is herein used. Instead, a mixture thereof with the polyurethane is employed which provides for a varying or gradual transition of material between the rigid epoxy coated fiberglass material and elastomeric material.

Accordingly, the present invention contemplates as its object a novel technique of integrating polyurethane with fiber glass in a manner to provide a coextensive bond of uniform unit strength between the two without impairing the inherent physical properties of the polyurethane and enabling the production of radomes, sonar domes and various leading edge constructions without detracting from the desirable mechanical properties of the glass fabric for the intended purposes.

In particular, the present invention comprises essentially the fusing of a sheet of pure polyurethane rubber or its equivalent to a surface of fiber or glass reinforced plastic by means of a gradated epoxy-polyurethane mixture. A linear polyurethane having excellent fiber-forming qualities may be formed through the condensation of a 1,6-hexamethylene diisocyanate with 1,4-butanedial Other equally satisfactory polyurethane rubbers are polyesterurethane and polyetherurethane which are well known in the art.

A technique employed for carrying out the invention comprises the steps of first providing in a mold, a layer of pure polyurethane rubber; secondly, applying thereto a plurality of sheets of a premixture of polyurethane and any well-known epoxy resin. Each sheet having a different proportion of polyurethane to epoxy resin so that the resultant second layer is gradated from a high concentration of polyurethane on the polyurethane side to a high concentration of epoxy resin on the fiber glass side. The thickness of the first and second layer together should be approximately 0.020 inches; thirdly, applying to the mixture a sheet of fiber glass; fourthly, curing the entire unit under heat and pressure. The temperatures and pressures to be used will vary with the types of polyurethane rubber and epoxy resins employed. The temperatures and pressures required to cure the individual materials are part of the manufacturer's specifications made available with purchase of the product. The temperature and pressure used to cure the combination of materials must be within the overlapping range created by the temperature and pressure ranges of the individual materials so that the curing process will not harm any of the materials. Curing may take place in an autoclave or over a die shaped to the desired contour for the finished panel, of which the polyurethane layer may be on the concave or convex side, depending on the surface of contact with the erosion medium.

The product thereby produced is effectively immune to erosion while serving as a protective surface for plastic radomes and sonar domes or for leading edges of helicopter rotor wing blades, hydrofoils, aircraft wings, missiles, etc., and also in a liner for containers of corrosive liquids.

A more complete understanding of the invention may be had upon reference to the accompanying drawing showing the product made according to the method of this invention.

In the drawing, the novel unit produced by the method according to the invention is designated as 10 which is a panel consisting of a polyurethane rubber sheet 11 placed in a mold, not shown, and having applied thereto a layer 12 consisting of a plurality of sheets of various mixture concentrations of epoxy resin and polyurethane rubber. The sheet having the highest polyurethane to epoxy ratio being next to polyurethane sheet 11. The sheet having the highest epoxy to polyurethane ratio being next to fiberglass sheet 13.

A fiber glass sheet 13 is lastly applied to composite layer 12 and the entire unit 10 is thereafter cured as a single process under a temperature and pressure sufficient to effect a fusing together of the layers 11, 12 and 13 into a single integrated panel. Since the transition layer 12 contains materials having properties exhibited by both the elastomeric surface 11 and the rigid backing 13, i.e., polyurethane and epoxy resin, respectively, distributed in a graduated manner, a satisfactory bond between layer 11 and sheet 13 is effected because a gradated transition of material occurs without the existence of interfaces.

In the heretofore-mentioned old technique of protecting radomes, a sharp interface between materials existed between the fiber glass substrate and synthetic rubber cover because in each instance an adhesive was used which was of a different material from the substrate material and the cover material. The adhesive interface, when the unit was loaded, provided points of weakness as the result of a wide difference in mechanical properties between the materials. The present invention, on the other hand, provides for a multiple-ply, layer panel which completely eliminates any problem of bonding between substrate and cover material since a graded or transition material containing a gradated transition from one material to the other, is made use of in fusing together the outer elastomeric layer of polyurethane rubber to a rigid inner layer of fiber glass.

What is claimed is:

1. A composite article to protect exposed material such as fiber glass against the damaging effects of environmental influences comprising:
   a protecting layer of polyurethane;
   a transition layer disposed between said fiber glass and said protecting layer, said transition layer comprising a gradated mixture of epoxy resin and polyurethane;
   wherein the highest concentration of epoxy resin is at the fiber glass side of said transition layer and the highest concentration of polyurethane is at the protecting layer side of said transition layer.

2. A method of protecting fiber glass against the damaging effects of environmental influences such as erosion and ablation which comprises:
   premixing plural quantities of epoxy resin and polyurethane, each quantity having a different epoxy to polyurethane ratio within the respective mixture;
   applying each quantity to a layer of polyurethane in a layered manner so that the quantity containing the highest concentration of polyurethane forms the first sheet, with each subsequent sheet containing a lower concentration of polyurethane and a higher concentration of epoxy resin;
   applying to said layered plural quantities a layer of fiber glass to be protected; and
   curing the contiguous layers as a unit so that all said layers unite into a mass that is highly concentrated epoxy resin on one side, highly concentrated polyurethane on the other side and a gradated transition from one material to the other in between the two sides.